United States Patent Office 3,719,468
Patented Mar. 6, 1973

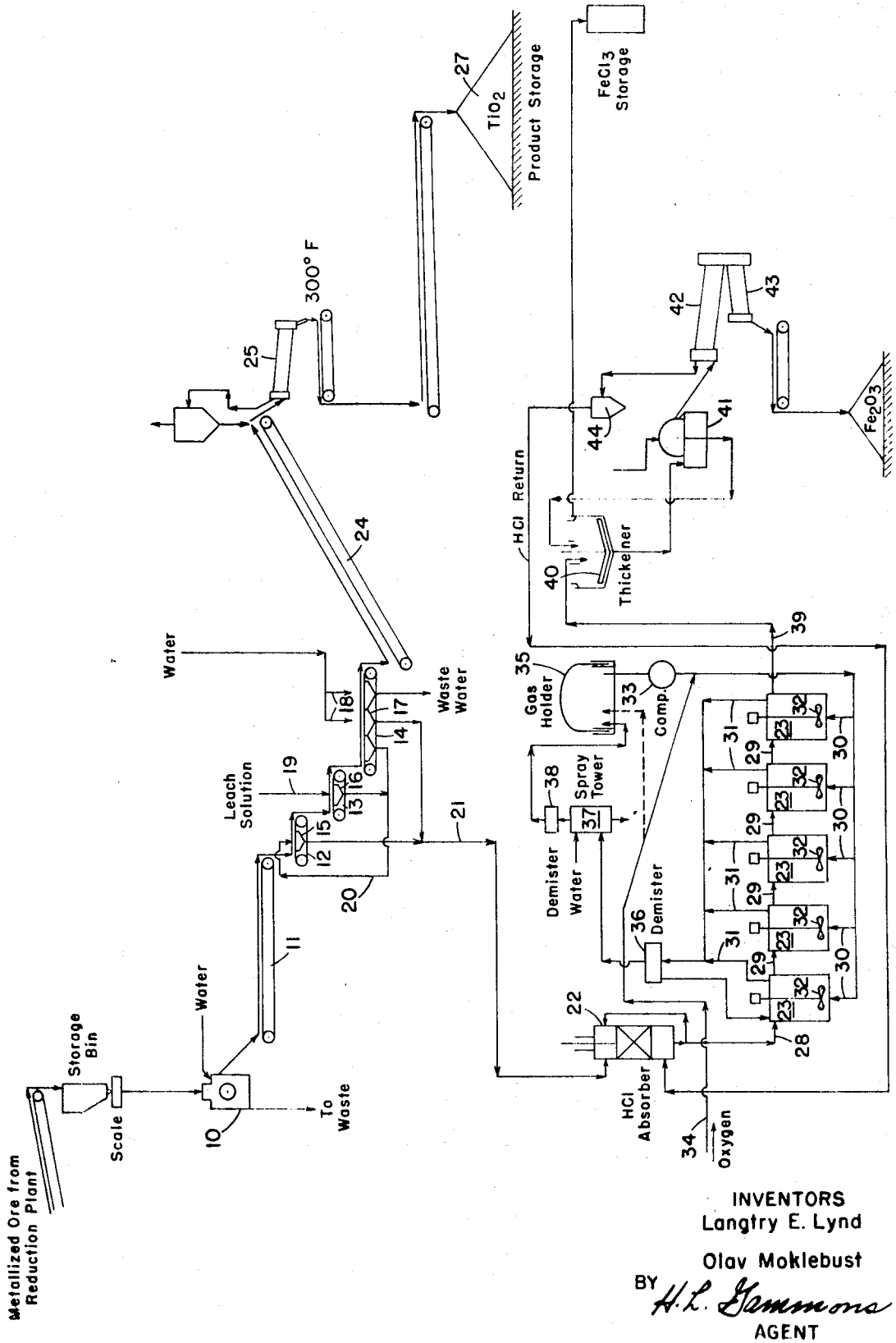

3,719,468
PROCESS FOR CONTINUOUSLY LEACHING TITANIFEROUS MATERIALS
Langtry E. Lynd, North Plainfield, and Olav Moklebust, Kendall Park, N.J., assignors to N L Industries, Inc., New York, N.Y.
Filed Nov. 20, 1970, Ser. No. 91,486
Int. Cl. C22b 1/00, 3/00
U.S. Cl. 75—1  16 Claims

ABSTRACT OF THE DISCLOSURE

Reduced titaniferous materials and in particular, ilmenite ore in which substantially all of the iron values are metallized is leached continuously to produce a $TiO_2$ concentrate and substantially pure iron oxide by-product by feeding the reduced titaniferous material onto an endless perforated belt, discharging a leach liquor comprising a ferric salt solution onto the reduced titaniferous material on said belt to dissolve the metallic iron and simultaneously separate the dissolved iron from the titaniferous material on said belt to produce a substantially iron free material from which residual gangue constituents are removed to produce a $TiO_2$ concentrate of about 95% $TiO_2$; the spent leach liquor containing the dissolved iron being continuously regenerated to form a ferric salt solution and a ferric hydroxide precipitate which is washed and calcined to form a substantially pure iron oxide by-product, the ferric salt solution being recycled to leach additional reduced titaniferous material.

BACKGROUND OF THE INVENTION

The increasing use for titanium in industry and in particular titanium dioxide and the steady rising cost of the source materials from which titanium dioxide is derived has made it imperative from the standpoint of economy to discover more efficient and less costly ways of recovering titanium values from available source materials, the most common of which are rutile ores and titaniferous materials such as ilmenite ore. While rutile ore when upgraded by the removal of gangue constituents, may comprise as high as 98% $TiO_2$ and hence is a preferred source material from the standpoint of $TiO_2$ content its cost is rising due to increased demand and limited reserves. The ilmenite ores including weathered ilmenites such as Quilon and Brazil beach sands or a massive ore such as the MacIntyre ores mined at Tahawus, N.Y., have lower amounts of $TiO_2$ and higher amounts of iron and hence are less desirable than rutile. However there are relatively large deposits of high grade ilmenite ores throughout the world, and the cost of these ores is relatively low. Nevertheless the increase in competition that has followed the ever expanding market for $TiO_2$ has made it imperative to discover more economical methods for recovering the titanium values from these ores.

While there are many disclosures in the literature of methods for upgrading ilmenite to produce $TiO_2$ concentrates suitable for use in the production of $TiCl_4$ and/or pigmentary $TiO_2$, most of these processes have been high temperature slagging operations, ore reduction with solid or gaseous reductants followed by acid leaching, or digestion of the ore with strong acids such as HCl. However each of these earlier techniques has suffered from one or more disadvantages which render them unattractive economically.

Among the more recent processes for producing $TiO_2$ concentrates from ilmenite ore is that described in U.S. 3,252,787—Shiah—May 24, 1966 which has as its object the production of a $TiO_2$ concentrate and simultaneously a high quality iron oxide from ilmenite ores wherein the iron values in the ore are first metallized and then removed by leaching with a ferric salt solution to produce a $TiO_2$ concentrate and a ferrous chloride filtrate. The latter is oxidized to form an iron oxide precipitate plus ferric chloride which is recycled to leach additional ore. However while this process is attractive from the standpoint of recovering two saleable products i.e. a $TiO_2$ concentrate and a high quality iron oxide by-product, such techniques as have been disclosed for leaching the reduced ore and regenerating the spent leach liquor embody the use of materials and equipment which quickly deteriorate due to corrosion and abrasion.

SUMMARY OF THE INVENTION

The present invention relates to improved process and apparatus for producing a $TiO_2$ concentrate and a high quality iron oxide by-product from titaniferous ores economically and in a manner to minimize equipment corrosion and/or abrasion; wherein the reduced ore is continuously leached by feeding the ore onto one or more endless perforated belts and spraying or otherwise discharging a leach liquor comprising a ferric salt solution onto the ore-laden belt, the leach liquor being drawn rapidly through the reduced ore to dissolve and simultaneously remove the iron therefrom and leave a substantially iron-free product on the belt which is thereafter discharged from the belt, dried and freed of residual gangue constituents to produce a $TiO_2$ concentrate containing from 91% to 97% $TiO_2$. The spent leach liquor is recovered from beneath the perforated belt (or belts) and comprises a ferrous-ferric salt solution which is fed continuously into a plurality of oxidizing tanks into each of which oxygen or an oxygen-containing gas is fed to regenerate the spent leach liquor thereby forming a slurry of iron hydroxide precipitate and an aqueous ferric chloride solution. The latter is separated from the iron hydroxide precipitate and recycled to leach additional reduced ore, while the iron hydroxide is washed and calcined to produce a substantially chloride-free iron oxide by-product.

DESCRIPTION OF DRAWING

The drawing is a flow diagram of the process of this invention in which the apparatus used is illustrated schematically.

PREFERRED EMBODIMENT OF THE INVENTION

In its preferred embodiment the invention contemplates the production of a $TiO_2$ concentrate and substantially pure iron oxide continuously and on a commercial scale by a continuous leaching and regeneration which insures economic advantages over earlier processes.

The titaniferous material used in practicing the present invention is an ilmenite ore and preferably a beach sand since the particle size is such as not to require grinding either before or after leaching, the $TiO_2$ concentrate produced therefrom being suitably sized for chlorination. Also the ore is preferably one in which substantially all of the iron values have been converted to ferric iron which in the case of some beach sands has been done by weathering; or may be done artificially by roasting the ore in the presence of air or oxygen. The oxidized ore is reduced by heating to a temperature in the range of from 700 to 1300° C. and in a reducing atmosphere to effect substantially complete conversion of the iron values to metallic iron.

The reduced ore is freed of gangue constituents by magnetic separation. This may be a dry or wet process and as shown in the drawing is preferably a wet separation wherein an aqueous ore slurry of about 30% solids is prepared and fed through a wet magnetic separator 10. The aqueous slurry product from the magnetic separator will comprise about 66% solids and is delivered onto a feed belt 11 which feeds a relatively thin layer of this product onto an endless perforated leaching belt. The latter may be a single unit but as disclosed in the drawing is preferably a complex of three perforated endless belts arranged successively as indicated at 12, 13 and 14 respectively and at progressively lower elevations whereby the ore-slurry moves by gravity feed from one belt to the next during leaching. Each endless belt embodies an air tight housing within which a partial vacuum is maintained to pull the leach liquor through the layer of ore-slurry on the belt into leach liquor collecting means, as indicated at 15, 16 and 17 respectively, located directly beneath the belts. In this embodiment of the invention both the endless belts 12 and 13 are of substantially the same length while the belt 14 is approximately twice as long and in this connection is provided with one or more water feed pipes 18 located directly above the rear-end of the belt for discharging wash water onto the leached ore before it leaves the leaching belt complex.

With regard to the use of perforated leaching belts, while belts of this type have been used as filters to carry out a mechanical separation of solid and liquid constituents the dissolution of metallic iron by a ferric salt solution is a chemical reaction and the discovery that this chemical reaction could be effected on a continuously moving perforated belt was wholly unexpected and came only after a thorough study and appreciation of the nature and rapidity of this chemical reaction.

In the preferred embodiment of the invention leaching is done countercurrently and to this end a leach liquor comprising, for example, a ferric salt solution comprising predominately ferric ions is fed by feed pipe 19 onto the intermediate ore-burdened leaching belt 13. The ore on this belt has already been partially leached of its metallic iron and hence when contacted by the concentrated ferric salt solution substantially all of the remaining metallic iron in the ore is dissolved and removed. As a consequence when he leached ore is transferred from intermediate belt 13 to the last belt 14, on which it is drained and washed with water, the ore is discharged therefrom as a substantially iron-free product. The concentration of the ferric salt solution is not critical but for practical purposes about 12% to as high as 75% of the iron in solution is in the form of ferric ions, the amount of solution used being sufficient to provide at least the stoichiometric quantity of ferric salt for completing the dissolution of the metallic iron in the ore.

Referring again to the intermediate leaching belt 13, the leach liquor collected therefrom and from the forward end of the leaching belt 14 constitute a somewhat dilute ferric salt solution, sometimes referred to herein as partially spent leach liquor, and is sent via feed pipe 20 to the first leaching belt 12 where it is sprayed or otherwise discharged onto the ore-slurry carried thereon. Since the ore-slurry on the first leaching belt contains a large amount of metallic iron maximum contact between the partially spent leach liquor and metallic iron is effected and hence a major portion of the iron is leached from the ore at the first leaching belt. The spent leach liquor from the first leaching belt together with wash water from belt 14 is collected and fed via pipe 21 to a series of oxidation tanks 23, for regeneration as hereafter described.

Returning again to the leaching belt complex the leached product discharged therefrom may contain slight amounts of metallic iron and some water and is carried by an elevator 24 up to a heater or kiln 25 in which the moist material is dried. From the kiln 25 the dried product, which comprises from 91 to 97% $TiO_2$ concentrate, is sent to storage 27.

Turning now to the spent leach liquor recovered from the leaching belt complex, this liquor comprises an aqueous salt solution of which about 75% of its total iron content is $Fe^{+2}$ and 25% $Fe^{+3}$ ions and is regenerated to form an aqueous salt solution of predominately ferric ions which is recycled to leach additional reduced ore. The regeneration of the spent leach liquor i.e. the ferrous-ferric salt solution is accomplished in a relatively rapid and efficient manner by reacting it with oxygen or an oxygen containing gas preferably with the addition of an acid such as HCl to aid in the regeneration, the reaction taking place progressively in a series of oxidizing tanks. To these ends the spent leach liquor in line 21 may be passed through an HCl absorber 22, and from thence via feed pipe 28 into the series of oxidation tanks 23 hereinabove identified. The tanks are sealed from the atmosphere and connected at their upper ends in series by discharge pipes 29. Oxygen feed pipes 30 are let into the bottoms of the respective tanks and gas discharge pipes 31 are connected into the tops thereof. In addition each tank is provided with a motor driven stirring blade 32. The aqueous ferrous salt solution i.e. the spent leach liquor is fed into the top of the first tank via inlet pipe 28 and overflows therefrom via outlet pipe 29 into the succeeding tanks. Oxygen or an oxygen containing gas such as air is fed by means of a compresser 33 into the bottom of each tank directly from an oxygen source 34, or alternatively from a holder 35 by which oxygen recovered from the oxidizing tanks may be recycled. The oxygen is fed into each of the several tanks at a rate of from about 7 to about 30 s.c.f.m./1000 gallons of spent leach liquor. With the stirring blades rotating the spent leach liquor flows from one oxidizing tank to the next during which time it is progressively oxidized to form a slurry comprising ferric salt solution and precipitated iron hydroxide. Throughout the oxidation period suitable measurements are taken, either manually or automatically, of the ratio of ferric and ferrous ions in the solution in the respective tanks to determine when the optimum ratio of ferric to ferrous ions is reached. In this connection it has been discovered that highest efficiencies are obtained when the ratio of ferric ions in solution to ferric ions precipitated as ferric hydroxide is in the range of about 1.5:1 to 2.5:1. The achievement of this optimum ratio in the shortest period of time is effectively controlled in part, by regulating the flow rates of the oxygen and degenerated leach liquor, respectively, into the tanks. The flow rate of the oxygen is usually in excess of the stoichiometric amount required to regenerate the ferrous salt solution and the excess oxygen plus other gases evolved during regeneration of the salt solution are let out of the tanks via pipes 31, fed into a demister 36 and from thence into a spray tower 37 and a second demister 38 whereby oxygen is recovered and recycled to the gas holder 35.

Turning again to the regenerating or oxidizing tanks 23 the slurry in the final tank of the series of tanks is discharged therefrom via pipe 39 and is sent via feed pipe to a slurry thickener 40 in which the slurry is slowly agitated to settle out the solid particulate iron hydroxide. The latter is discharged from the bottom of the thickener 40 and fed from thence to a drum-filter unit 41 where it is filtered and washed to remove absorbed ferric salt solution and then sent to a dryer or kiln 42 in which the iron hydroxide is calcined and discharged as $Fe_2O_3$ via cooling barrel 43 to storage. During calcination some residual chlorine values will be volatilized in kiln 42 as hydrogen chloride which together with any iron oxide particles are sent to a separator 44 from which the iron oxide is sent to storage. A portion of the gaseous hydrogen chloride recovered is sent to the HCl absorber 22.

As will be evident from the above description the leach liquor is one containing a high percentage of ferric ions and while a ferric salt solution such as ferric chloride was used in the example which follows, satisfactory results may be achieved with the use of other ferric salts such as ferric sulfate.

The following specific example will serve to further describe and illustrate a practical embodiment of the invention as practiced on a commercial scale. It will be understood however that the example is by way of illustration only and not limiting of the invention.

An ilmenite ore and more particularly a beach sand ilmenite is prepared by heating the ore in a reducing atmosphere to convert substantially all of the iron values to metallic iron, the reduced ore having the following analysis:

| | |
|---|---|
| TiO₂ | 69–70%. |
| Fe(total) | 27%. |
| Fe(metal) | 26%. |
| Bulk density | 140 lbs./ft. |
| Particle size | −35 mesh+150 mesh. |

To this reduced ore is added enough water to form an aqueous slurry of about 30% solids. This slurry is fed to a 2-drum wet magnetic separator such as a Jeffrey-Separator which removes the gangue constituents. The magnetic fraction containing about 71% TiO₂ in the solids and about 25% moisture is fed onto a conveyor belt which discharges the moist material at the rate of about 10 TPH (dry basis) onto the continuous leaching equipment which as shown in the flow diagram was in the form of three endless foraminous belts. The ore feed rate and the linear speed of the belts is such that the bed thickness of the ore on the belts is from 1 to 1.5 inches. The first two belts and the forward half of the third belt effects countercurrent leaching while the last half of the third belt provides two stages of washing.

Leaching proceeded according to the equation:

$$2Fe^{+3} + Fe^{\circ} \rightarrow 3Fe^{+2}$$

The ferric ions used for leaching the metallized ore are furnished as an aqueous ferric-ferrous chloride solution in which about 75% of the total iron content is ferric ions and about 25% ferrous ions and is discharged as a liquid spray onto the second of the three leaching belts at a temperature of about 145° F. and at the rate of about 410 g.p.m. A vacuum of from 8 to 10 inches water is maintained in each of the leaching belt units. The leaching time for an ore increment traveling the length of the three leaching belts is from about 5.0 to 15 minutes. The leached and washed ore discharged from the end of the last leaching belt is dried by heating to about 300° F. then processed through a magnetic separator to yield a TiO₂ concentrate analyzing about 94% TiO₂ and no more than about 3.0% total iron. The TiO₂ concentrate is discharged from the separator at the rate of about 6.4 TPH, the particle size distribution of the TiO₂ concentrate being substantially the same as the original reduced ore.

The spent leach liquor recovered from the leaching belts complex comprises an aqueous solution in which about 75% of its total iron content is Fe⁺² ions and about 25% Fe⁺³ ions and is fed continuously at the rate of about 422 g.p.m. to a series of oxidizing tanks via the HCl absorber. The temperature of the spent leach liquor entering the oxidizing tanks is between 178–183° F. Each oxidizing tank is equipped with a stirring blade which is motor driven. Oxygen is fed into each tank at the rate of about 560 s.c.f.m. at a temperature of about 113° F. The reaction in the tanks is as follows:

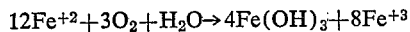

$$12Fe^{+2} + 3O_2 + H_2O \rightarrow 4Fe(OH)_3 + 8Fe^{+3}$$

This reaction is exactly the reverse of leaching and regeneration of the ferrous ions is carefully controlled to insure an optimum ratio of Fe⁺³ ions in solution to ferric ions precipitated as ferric hydroxide. This ratio was found to be about 2:1.

Regeneration of the ferrous chloride solution proceeds continuously and the resulting slurry, comprising precipitated iron hydroxide and ferric chloride, is discharged continuously from the end tank at the rate of about 415 g.p.m.

This slurry, which comprises about 25% solids is pumped to a thickener in which the iron hydroxide is made to settle out of the ferric chloride and is discharged from the bottom of the thickener to a drum-type filter unit on which the iron hydroxide is washed and then sent to a drying kiln in which it is calcined at a temperature of about 1100° F. to produce Fe₂O₃. During drying absorbed chlorides are volatilized as hydrogen chloride. The dried iron oxide is recovered from the drier at the rate of about 3.7 TPH and comprises substantially 100% Fe₂O₃.

From the foregoing description it will be evident that the present invention provides a process for producing both high grade TiO₂ concentrate and substantially pure iron oxide from ilmenite ore continuously and more efficiently than earlier leaching operations; and that the speed and effectiveness of the process of this invention depends in large measure on the discovery that because of the nature and rapidity of the reaction of ferric ions with metallic iron the reaction can be completed on a moving endless belt whereby the ore is leached of its iron and simultaneously separated from the leach liquor.

While this invention has been described and illustrated by the examples shown, it is not intended to be strictly limited thereto, and other variations and modifications may be employed within the scope of the following claims.

What is claimed is:

1. In a process for producing a titanium dioxide concentrate and a substantially pure iron oxide by-product from titaniferous materials in which substantially all of the iron values are in the form of ferric oxide wherein the titaniferous material is heated in a reducing atmosphere to convert substantially all of the ferric oxide to metallic iron, and the metallic iron is leached from the reduced material with a ferric salt solution to produce a slurry comprising a ferric salt solution and an iron hydroxide precipitate the improvement comprising: leaching said reduced titaniferous material by continuously feeding a relatively thin layer of said titaniferous material onto an endless perforated leaching belt, contacting said thin layer of reduced titaniferous material with a leach liquor comprising a ferric salt solution said leach liquor being discharged onto the upper surface of said thin layer of titaniferous material, maintaining a vacuum on the underside of said thin layer of titaniferous material to induce said leach liquor (and biased) to pass downwardly therethrough to rapidly leach the metallic iron therefrom and simultaneously separate the resulting spent leach liquor from the reduced titaniferous material on said leaching belt so as to produce a substantially iron-free product on said belt, said spent leach liquor comprising a ferrous-ferric salt solution, discharging the iron-free product from said moving belt as a TiO₂ concentrate, regenerating said spent leach liquor by passing oxygen therethrough to form a ferric hydroxide precipitate and a predominately ferric salt solution and recycling said ferric salt solution to leach additional reduced titaniferous material.

2. In a process for producing a titanium dioxide concentrate and a substantially pure iron-oxide by-product from titaniferous materials according to the improvement of claim 1 wherein said ferric salt leach liquor is an aqueous solution of ferric chloride.

3. In a process for producing a titanium dioxide concentrate and a substantially pure iron-oxide by-product from titaniferous materials according to the improvement of claim 1 wherein said ferric salt leach liquor is an aqueous solution of ferric sulfate.

4. In a process for producing a titanium dioxide concentrate from titaniferous materials according to the improvement of claim 1 wherein the reduced titaniferous material on said perforated leaching belt is leached of its iron by spraying said ferric salt leach liquor onto said thin layer of reduced titaniferous material.

5. In a process for producing a titanium dioxide concentrate from titaniferous materials according to the improvement of claim 1 wherein the thin layer of reduced titaniferous material is fed into the topside of said perforated leaching belt and a partial vacuum is maintained on the underside of said leaching belt whereby the ferric salt leach liquor is drawn relatively rapidly through said thin layer of reduced titaniferous material.

6. In a process for producing a titanium dioxide concentrate from titaniferous materials according to the improvement of claim 5 wherein leaching is done countercurrently.

7. In a process for producing a titanium dioxide concentrate from titaniferous materials according to the improvement of claim 1 wherein the perforated leaching belt comprises a plurality of leaching belts arranged in series, the partially leached titaniferous material produced on the first of said series of belts being discharged as a thin layer onto succeeding leaching belts for additional leaching by said ferric salt leach liquor to produce a substantially iron-free product.

8. In a process for producing a titanium dioxide concentrate from titaniferous materials according to the improvement of claim 7 wherein the titaniferous material on said series of leaching belts is leached countercurrently, said counter-current leaching being effected by leaching the reduced titaniferous material on the perforated leaching belt next succeeding the first leaching belt of said series of belts with a relatively highly concentrated ferric salt solution and leaching the titaniferous material on the first leaching belt of said series of belts by the partially spent leach liquor recovered from succeeding filter belts.

9. In a process for producing a titanium dioxide concentrate from titaniferous materials according to the improvement of claim 7 wherein the thin layer of leached substantially iron-free product on the last of said series of perforated leaching belts is water-washed while still on said belt, discharged therefrom and then dried and fed to a magnetic separator to remove any residual metallic iron therefrom to produce a $TiO_2$ concentrate comprising from 91–97% $TiO_2$ and no more than about 3.0% total iron.

10. In a process for producing a titanium dioxide concentrate from titaniferous materials according to the improvement of claim 2 wherein the spent leach liquor recovered from said leaching belt is regenerated by feeding said spent leach liquor into an oxidizing tank into which an oxygen containing gas is fed to convert said spent leach liquor to a slurry comprising an aqueous ferric chloride solution and precipitated ferric hydroxide in the presence of excess oxygen the rates of feed of said oxygen and said spent leach liquor being adjusted such that the ratio of ferric ions in solution to ferric ions precipitated as ferric hydroxide is in the range of about 1.5:1 to 2.5:1.

11. In a process for producing a titanium dioxide concentrate from titaniferous materials according to claim 10 wherein the oxygen containing gas is oxygen, said oxygen being fed to said oxidizing tank at a rate in the range from 6.9 to 145 s.c.f.m./1000 gallons of filtrate.

12. In a process for producing a titanium dioxide concentrate from titaniferous materials according to claim 10 wherein the excess oxygen is collected and recycled to oxidized additional spent leach liquor.

13. In a process for producing a titanium dioxide concentrate from titaniferous materials according to claim 10 wherein the precipitated ferric hydroxide is separated and recovered from said aqueous ferric chloride solution by settling and said aqueous ferric chloride solution is recycled to leach additional reduced titaniferous material.

14. In a process for producing a titanium dioxide concentrate from titaniferous materials according to claim 13 wherein the ferric hydroxide recovered from said aqueous ferric chloride solution is washed, filtered and calcined to produce a relatively pure iron oxide by-product.

15. In a process for producing a titanium dioxide concentrate from titaniferous material according to claim 14 wherein the ferric hydroxide recovered from said slurry and containing small amounts of absorbed ferric chloride solution is calcined by heating to a temperature sufficiently high to volatilize the chlorine as hydrogen chloride, and absorbing the hydrogen chloride in additional spent leach liquor.

16. A continuous process for producing a titanium dioxide concentrate and a substantially pure iron oxide byproduct from an ilmenite ore in which substantially all of the iron values are in the form of ferric oxide comprising steps of: heating said ilmenite ore in a reducing atmosphere at a temperature sufficiently high to convert substantially all of said iron oxide to metallic iron, separating and removing the gangue constituents from the reduced ore by passing the latter through a magnetic separator, leaching the metallic iron from the gangue-free reduced ore countercurrently by feeding a relatively thin layer of said gangue-free ore continuously onto an endless perforated belt, contacting said thin layer of partially-leached ore on said belt at a point intermediate opposite ends thereof with an aqueous ferric chloride leach solution by discharging said leach solution onto the upper surface of said thin layer of gangue-free ore, maintaining a vacuum on the underside of said thin-layer of ore to induce said leach solution (being biased) to pass downwardly through said ore to rapidly leach the metallic iron therefrom, and simultaneously separating the resulting spent leach liquor from the substantially iron-free product on said belt recovering said partially spent leach liquor and circulating said partially spent leach liquor to the forward end of said filter belt to leach the gangue-free ore thereon to simultaneously produce and separate a partially leached ore on said belt and a spent ferrous chloride leach liquor, water washing the iron-free product adjacent the rear-end of said leaching belt, discharging the washed product from said belt and removing residual metallic iron from the washed substantially iron-free product to produce a $TiO_2$ concentrate, recovering the said spent ferrous chloride leach liquor from the forward end of said filter belt, regenerating said spent ferrous chloride leach liquor by passing said liquor through a plurality of oxidizing tanks in series and feeding an oxygen containing gas into each of said tanks to convert the spent leach liquor to a slurry comprising an aqueous ferric chloride solution and a ferric hydroxide precipitate, separating said ferric hydroxide precipitate from said aqueous ferric chloride solution, heating said ferric hydroxide to remove absorbed chlorine values therefrom as gaseous hydrogen chloride and produce a substantially pure iron-oxide by-product, recovering and recycling the said aqueous ferric chloride solution to leach additional reduced ore and adding a portion of said gaseous hydrogen chloride to said spent leach liquor to aid the regeneration thereof.

References Cited
UNITED STATES PATENTS

| | | | |
|---|---|---|---|
| 2,912,320 | 11/1957 | Chang | 75—26 |
| 3,400,871 | 9/1968 | Davis | 266—12 |
| 3,252,787 | 5/1966 | Shiah | 75—104 |
| 3,383,200 | 5/1968 | Volk | 75—26 |
| 2,758,019 | 8/1956 | Daubenspeck | 75—1 |
| 2,183,365 | 12/1939 | Booge | 75—1 |
| 3,264,099 | 8/1966 | Johnson | 266—12 |
| 3,244,512 | 4/1966 | Gravenor | 75—104 |
| 3,416,885 | 12/1968 | Honchar | 75—1 |
| 3,224,870 | 12/1965 | Johnson | 75—26 |
| 3,457,037 | 7/1969 | Aramendia | 75—1 |

HYLAND BIZOT, Primary Examiner

P. D. ROSENBERG, Assistant Examiner

U.S. Cl. X.R.

75—104